(12) United States Patent
Kim (10) Patent No.: US 8,134,267 B2
(45) Date of Patent: Mar. 13, 2012

(54) MOTOR INCLUDING A ROTOR AND A STATOR, AND WASHING MACHINE USING THE SAME

(75) Inventor: Sung Jung Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 255 days.

(21) Appl. No.: 12/382,004

(22) Filed: Mar. 5, 2009

(65) Prior Publication Data

US 2009/0224622 A1 Sep. 10, 2009

(30) Foreign Application Priority Data

Mar. 6, 2008 (KR) .................. 10-2008-0020883
Mar. 6, 2008 (KR) .................. 10-2008-0020884

(51) Int. Cl.
*H02K 21/12* (2006.01)
*H02K 1/22* (2006.01)

(52) U.S. Cl. ......... 310/156.38; 310/156.26; 310/156.36; 310/265

(58) Field of Classification Search ............ 310/156.26, 310/156.36, 156.38, 265, 156.01, 156.08, 310/406, 156.12, 153
See application file for complete search history.

(56) References Cited

U.S. PATENT DOCUMENTS

| | | | |
|---|---|---|---|
| 2005/0144990 A1* | 7/2005 | Kim et al. ................. | 68/140 |
| 2006/0255677 A1* | 11/2006 | Takehara et al. ......... | 310/156.43 |

FOREIGN PATENT DOCUMENTS

| | | | |
|---|---|---|---|
| CN | 2552235 Y | | 5/2003 |
| CN | 1689213 A | | 10/2005 |
| JP | 2001-054262 A | | 2/2001 |
| JP | 2001069738 A | * | 3/2001 |
| JP | 2003-102156 A | | 4/2003 |
| JP | 2003161314 A | * | 6/2003 |
| JP | 2006074864 A | * | 3/2006 |
| JP | 2007104887 A | * | 4/2007 |
| KR | 10-2004-0007762 A | | 1/2004 |

OTHER PUBLICATIONS

MAchine Translation JP2003161314 (2003), JP2006074864 (2006).*
Machine Translation JP2001-069738 (2001) and JP2007-104887 (2007).*

* cited by examiner

*Primary Examiner* — Quyen Leung
*Assistant Examiner* — Jose Gonzalez Quinones
(74) *Attorney, Agent, or Firm* — McKenna Long & Aldridge LLP (57) ABSTRACT

The present invention relates to a motor. A motor including a stator and a rotor that is rotatably provided at an outer side in a radial direction of the stator, the rotor comprising: a base part; a side wall part that is integrally formed with the base part and vertically extended with respect to the base part; and a permanent magnet that is provided at an inner side of the side wall part, wherein a spacing distance from an inner side surface of the base part to a lower end of the permanent magnet is formed to be larger than a radial thickness of the permanent magnet.

9 Claims, 11 Drawing Sheets

MOTOR INCLUDING A ROTOR AND A STATOR, AND WASHING MACHINE USING THE SAME

CROSS REFERENCE TO RELATED APPLICATION

This application claims the benefit of the Patent Korean Application Nos. 10-2008-0020883, filed on Mar. 6, 2008 and 10-2008-0020884, filed on Mar. 6, 2008 which are hereby incorporated by reference as if fully set forth herein.

BACKGROUND OF THE DISCLOSURE

1. Field of the Disclosure

The present invention relates to a motor, and more particularly, to relates an outer type motor. In particular, the present invention relates to a motor with an increased efficiency and an improved cogging torque performance by minimizing leaked magnetic flux. Further, the present invention relates to a motor usable for a direct drive type washing machine and a washing machine using the same.

2. Discussion of the Related Art

Generally, a motor transfers a rotating force of a rotor to a rotating axis such that the rotating axis drives a load. For example, the rotating axis is connected to a drum of a washing machine to drive the drum and is connected to a fan of a refrigerator to drive the fan such that a cooling air is supplied to a necessary space.

On the other hand, in such a motor, the rotor rotates by an electromagnetic interaction with a stator. To this end, a coil is wound on the stator and a current is applied the coil, such that a rotating magnetic field is generated between the coil wound on the stator and a permanent magnet of the rotor, thereby rotating the rotor.

Hereinafter, a structure of the rotor and the stator of the motor will be described with reference to the accompanying drawings.

Figure 1:
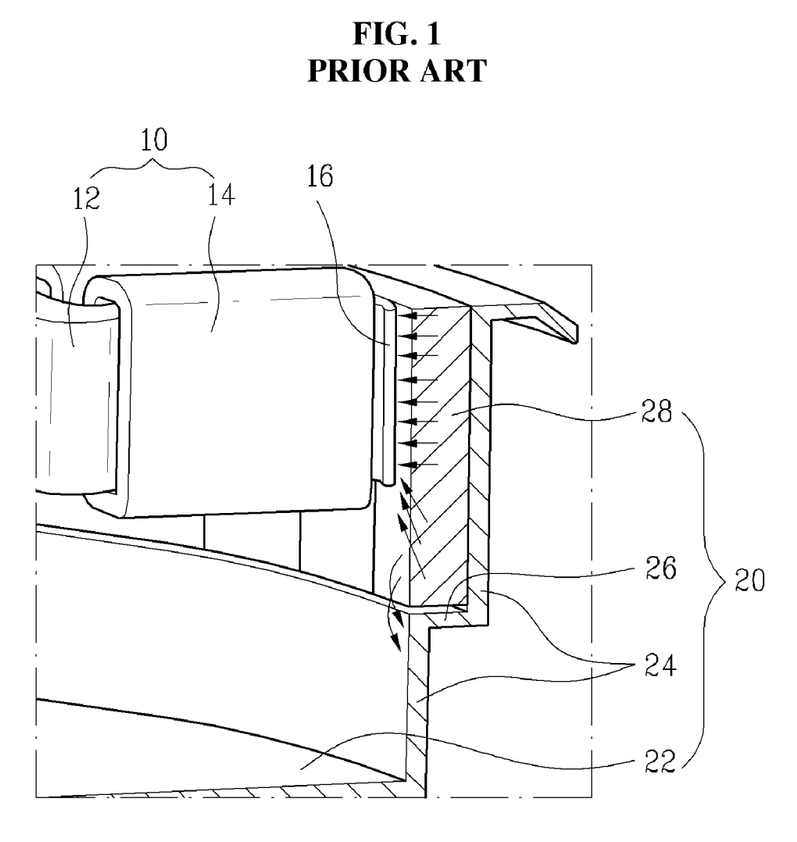
FIG. 1 is a cut perspective view showing a portion of a motor according to the related art.
Figure 2:
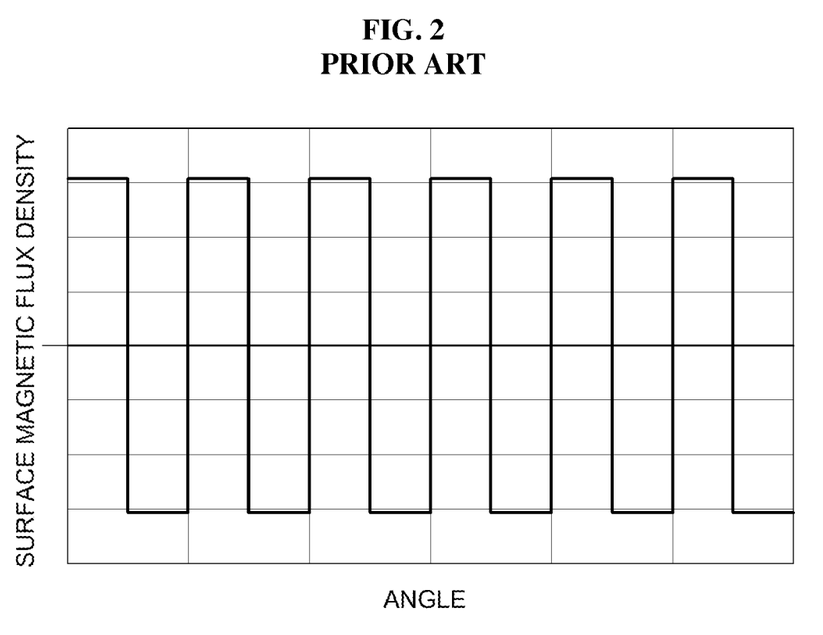
FIG. 2 is a graph schematically showing magnetic flux density of the motor according to the related art.

FIG. 1 is a cut perspective view showing a portion of a motor according to the related art. FIG. 2 is a graph schematically showing a magnetic flux density of a motor according to the related art.

As shown in FIG. 1, a stator 10 of a motor is configured to include a stator core 12 that includes a coil 14 and a plurality of teeth 16 on which the coli 14 is wound and an insulator (not shown) that insulates between the coil 14 and a stator core 12.

The rotor 20 is provided to surround the stator 10 and the rotor 20 includes a side wall part 24 and a base part 22. A central part of the base part 22 is connected with a rotating axis (not shown) to be rotated and an inner side of the side wall part 24 is magnetized with a permanent magnet 28 provided in a circumferential direction. A plurality of permanent magnets 28 are provided along the circumferential direction of the side wall part 24. On the other hand, the side wall part 24 is provided with a bending part 26 that supports and magnetizes the lower portion of the permanent magnetic 28.

As described above, in the motor according to the related art, the magnetic flux from the permanent magnet 28 of the rotor 20 does not enter the stator 10 but enters an adjacent rotor 20, thereby generating a leaked magnetic flux. In other words, there is a problem in that the efficiency of the motor is degraded due to leaked magnetic flux.

More specifically, the side wall part 24 and the base part 22 of the rotor 20 are formed of a magnetic material. Thereby, there is a problem in that the magnetic flux due to the permanent magnet 28 is leaked through the side wall part 24 or the base part 22, not the stator 10.

In particular, when the bending part 26 for fixing the permanent magnet 28 is formed, there may cause a problem in that the magnetic flux is directly leaked through the bending part 26.

Further, the problem of the leaked magnetic flux more increases as a height of the permanent magnet 28 is larger than a stacked height of the stator 10 facing the permanent magnet 28, as shown.

In other words, when a lower end portion of the permanent magnet 28 more approaches the rotor 20, in particular, the base part 22 or the bending part 26 than the stator 10, there is a problem in that the leaked magnetic flux more increases.

Further, the bending part 26 is formed by a press processing. Since this is not a machine processing, the dimension is not very precise. Therefore, when a permanent magnet 229 is magnetized to the bending part 26 molded by the press, a deviation in a fixed height of the permanent magnet 28 may be caused.

In the related art, the permanent magnet 28 is formed in a plurality of pieces and is coupled with to the inner side wall of the rotor 20 in a circumferential direction. The permanent magnet 28 is magnetized so that an N pole and an S pole are alternately formed along a circumferential direction.

And, an inner side surface of the permanent magnet 28 is formed in a curved form and an interval (gap) with the stator 10 is constantly formed along the circumferential direction. The permanent magnet in such a form is generally referred to as a C type permanent magnet.

Therefore, as shown in FIG. 2, the magnetizing waveform of the permanent magnet 28 appears as an approximately square wave form according to an angle and as a trapezoidal form, such that a point where magnetic pole suddenly changes along the circumferential direction of the rotor 20 is formed. In other words, the magnetic pole suddenly changes at a point passing from a specific permanent magnet 28 to a neighboring permanent magnet 28.

In general, in a brushless DC (BLDC) motor, the rotating speed of the rotor 20 is controlled by an inverter. In other words, after an alternating current voltage, which is a commercial voltage, is converted into a direct current voltage, the direct current voltage is converted into a three phase (u, v, w) alternating current voltage again and then, the three phase alternating current voltage is applied to the motor.

And, the magnitude and frequency in voltage applied to the motor are controlled by controlling a magnitude of a duty ratio as a pulse width modulation waveform.

Meanwhile, a scheme of driving the inverter may be divided into a square wave driving scheme and a sine wave driving scheme. This is divided according to whether a conduction angle is 180° or 120° in 6 switching sequences of the three phase inverter.

Herein, when the inverter has the conduction angel of 120°, since harmonic component is small, it more approaches the sine wave, such that it mainly uses the sine wave driving scheme so as to drive the motor for the washing machine.

However, in the motor according to the sine wave driving scheme and the motor having a magnetizing form, the cogging torque, etc., occurs due to the square wave magnetizing form of the motor. A torque ripple pulsating other than a torque driving the motor occurs due to the problem, which results from problems of reducing the efficiency of the motor and increasing the vibration and noise.

In other words, the cogging torque occurs due to the sudden change of the interaction of the slot and the permanent magnet 28 between the teeth on which the coil 14 is wound while the motor rotates and as the magnetizing form of the permanent magnet 28 approaches the square wave, there is a problem in that the cogging torque more increases.

Therefore, in a general direct drive type motor, a need exists for a scheme to solve the problems of the cogging torque increased due to the square wave magnetizing form of the permanent magnet and thus, the vibration and noise.

SUMMARY OF THE DISCLOSURE

Accordingly, it is an object of the present invention to provide a motor with improved efficiency by minimizing magnetic flux leaked from a rotator.

Further, it is another object of the present invention to provide a motor with improved efficiency by reducing an influence due to a cogging torque and a harmonic wave and thus, reducing vibration and noise.

In addition, it is still another object of the present invention to provide a motor that can be easily mass-produced by simplifying a manufacturing process of the motor.

In order to achieve the above objects, there is provided a motor according to one embodiment of the present invention including a stator and a rotor that is rotatably provided at an outer side in a radial direction of the stator, the rotor comprising: a base part; a side wall part that is integrally formed with the base part and vertically extended with respect to the base part; and a permanent magnet that is provided at an inner side of the side wall part, wherein a spacing distance from an inner side surface of the base part to a lower end of the permanent magnet is formed to be larger than a radial thickness of the permanent magnet.

The base part and the side wall part of the rotor are integrally formed by press-processing a steel plate.

Preferably, a height of the permanent magnet is formed to be larger than a stacked height of the stator facing the permanent magnet.

Preferably, the side wall part is formed with a bending part to reinforce its intensity.

Preferably, the radial thickness of the permanent magnet is formed at a thickness projected with respect to the bending part.

Preferably, an inner diameter of the permanent magnet is smaller than an inner diameter formed by the bending part.

Preferably, the spacing distance between a lower end of the permanent magnet and an upper end of the bending part is formed to be larger than the radial thickness of the permanent magnet.

Preferably, the permanent magnet is provided in plurality along a circumferential direction of the rotor.

Preferably, an inner circumferential surface of the permanent magnet is formed in a curved surface having a curvature radius so that the radial thickness becomes smaller as going from the center of the permanent magnet to the circumferential direction.

Preferably, an outer circumferential surface of the permanent magnet is formed in a curved surface having a curvature radius so that the radial thickness becomes smaller as going from the center of the permanent magnet to the circumferential direction.

Preferably, the inner circumferential surface and outer circumferential surface of the permanent magnet are formed in the same curvature radius so that the radial thickness becomes smaller as going from the center of the permanent magnet to the circumferential direction.

Preferably, the base part and the side wall part are integrally formed of a magnetic material.

In order to achieve the above objects, there is provided a motor according to another embodiment of the present invention including a stator and a rotor that is rotatably provided at an outer side in a radial direction of the stator, the rotor comprising: a base part; a side wall part that is integrally formed with the base part and vertically extended with respect to the base part; and a plurality of permanent magnets that are provided at an inner side of the side wall part according to a circumferential direction and has a curvature radius so that an inner circumferential surface and an outer circumferential surface has the smaller radial thickness as going from the center thereof to the circumferential direction.

Preferably, a spacing distance from an inner side surface of the base part to a lower end of the permanent magnet is formed to be larger than a radial thickness at a center of the permanent magnet.

Preferably, the side wall part includes a bending part to reinforce its intensity.

Preferably, a spacing distance from an inner side surface of the bending part to a lower end of the permanent magnet is formed to be larger than a radial thickness at a center of the permanent magnet.

In order to achieve the above objects, there is provided a washing machine according to one embodiment of the present invention comprising: a cabinet that forms an external appearance; a tub that is installed inside the cabinet; a drum that is rotatably installed inside the tub; a motor including a stator that is fixed to the tub and a rotor that is rotatably provided at a radial outer side of the stator; and a washing shaft that transfers a rotating force of the motor to the drum, wherein the rotor comprises: a base part; a side wall part that is integrally formed with the base part and vertically extended with respect to the base part; and a permanent magnet that is provided at an inner side of the side wall part, wherein a spacing distance from an inner side surface of the base part to a lower end of the permanent magnet is formed to be larger than a radial thickness of the permanent magnet. Preferably, a height of the permanent magnet is formed to be larger than a stacked height of the stator facing the permanent magnet.

Preferably, the side wall part is formed with a bending part to reinforce its intensity.

Preferably, the radial thickness of the permanent magnet is formed at a thickness projected with respect to the bending part.

Preferably, an inner diameter formed by the permanent magnet is smaller than an inner diameter formed by the bending part.

Preferably, the spacing distance between a lower end of the permanent magnet and an upper end of the bending part is formed to be larger than the radial thickness of the permanent magnet.

Preferably, the permanent magnet is provided in plurality along a circumferential direction of the rotor.

Preferably, an inner circumferential surface of the permanent magnet is formed in a curved surface having a curvature radius so that the radial thickness becomes smaller as going from the center of the permanent magnet to the circumferential direction.

Preferably, an outer circumferential of the permanent magnet are formed in a curved surface having a curvature radius so that the radial thickness becomes smaller as going from the center of the permanent magnet to the circumferential direction.

Preferably, the inner circumferential surface and outer circumferential surface of the permanent magnet are formed in a curved surface having the same curvature radius so that the radial thickness becomes smaller as going from the center of the permanent magnet to the circumferential direction.

Preferably, the base part and the side wall part are integrally formed of a magnetic material.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

A motor according to the present invention may be a motor that is used for home appliances having a relatively large volume such as a washing machine, a dryer, or a dish washer, but is not necessarily limited thereto.

First, exemplary embodiments of the present invention will be described in detail with reference to, for example, a direct drive type washing machine to which a motor according to the present invention can be applied.

Figure 3:
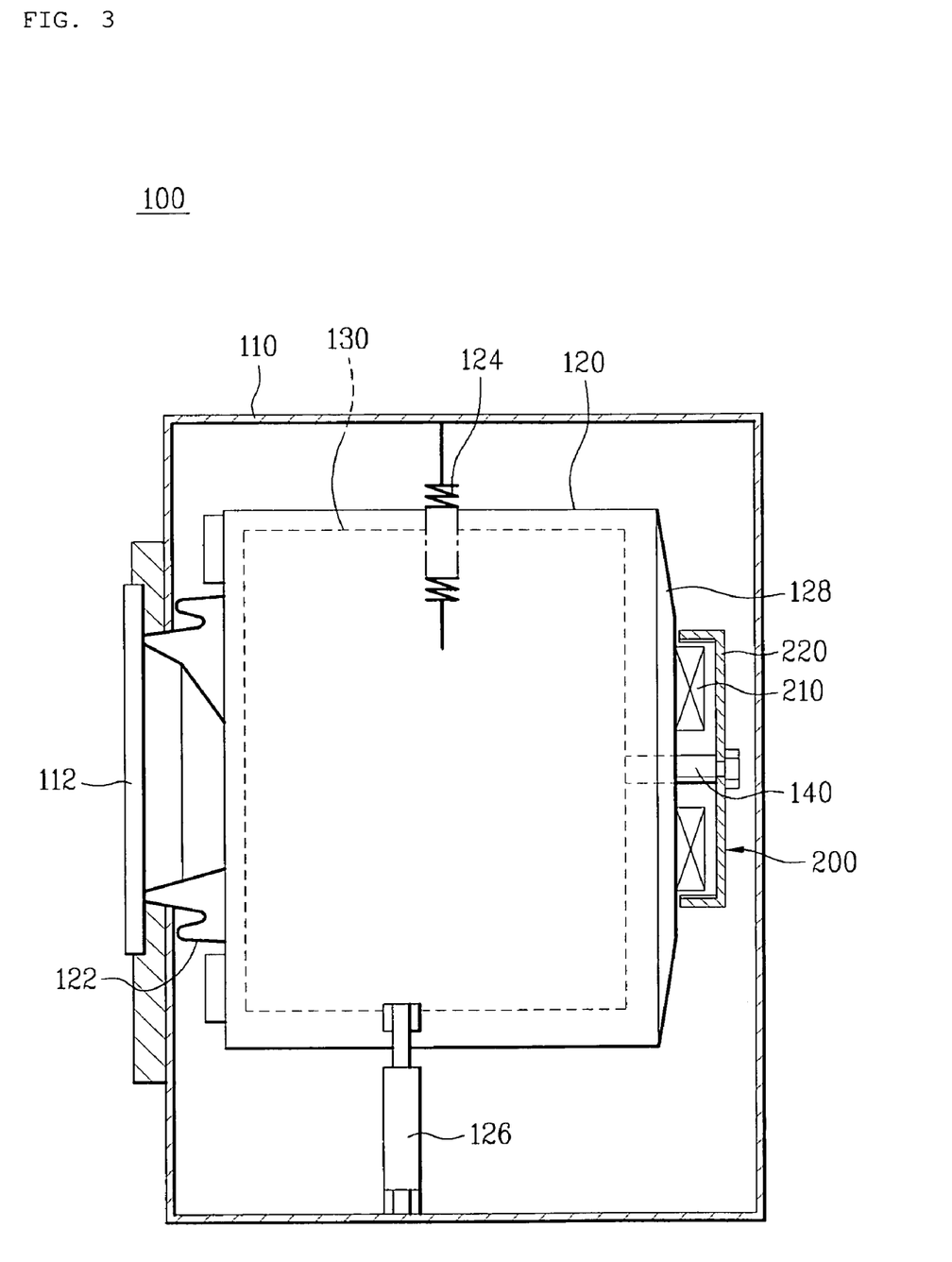
FIG. 3 is an exemplified diagram showing a washing machine using a motor according to an embodiment of the present invention.

FIG. 3 is an exemplified diagram showing a washing machine using a motor according to an embodiment of the present invention.

As shown, a washing machine 100 includes a tub 120 that is installed inside a cabinet 110, a drum 130 that is installed inside the tub 120, a washing shaft 140 that is connected to a shaft of the drum 130 and transfers a driving force of the motor 200 to the drum 130, and a bearing housing (not shown) that is installed on an outer circumferential surface of both ends of the washing shaft 140.

And, a door 112 is installed in front of the cabinet 110 and a gasket 122 is installed between the door 112 and the tub 120.

Meanwhile, a hanging spring 124 supporting the tub 120 is installed between an inner side on an upper surface of the cabinet 110 and an upper side on an outer circumferential surface of the tub 120 and a fraction damper 126 is installed between an inner side on a lower surface of the cabinet 110 and a lower side on an outer circumferential surface of the tub 120 to attenuate vibration of the tub 120 generated upon performing dehydration.

Herein, the motor 200 includes a stator 210 that is fixed to a side of a rear wall part of the tub 120 and a rotor 220 provided to surround the stator and directly transfers the driving force of the rotor 220 to the drum through the washing shaft 140.

Hereinafter, the motor according to the embodiment of the present invention will be described in detail with reference to FIGS. 4 and 5.

Figure 4:
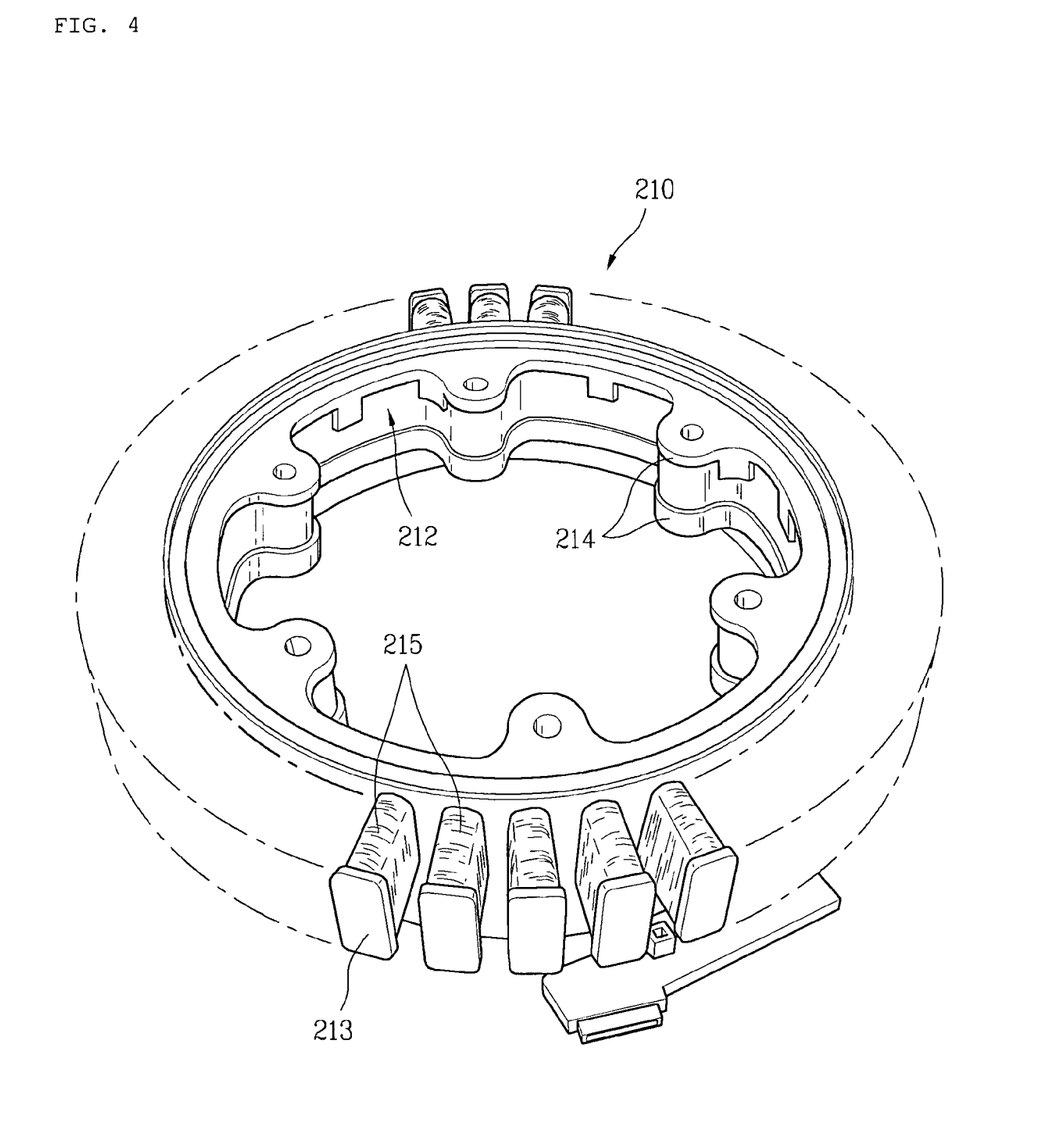
FIG. 4 is a perspective view showing a stator of the motor according to the embodiment of the present invention.
Figure 5:
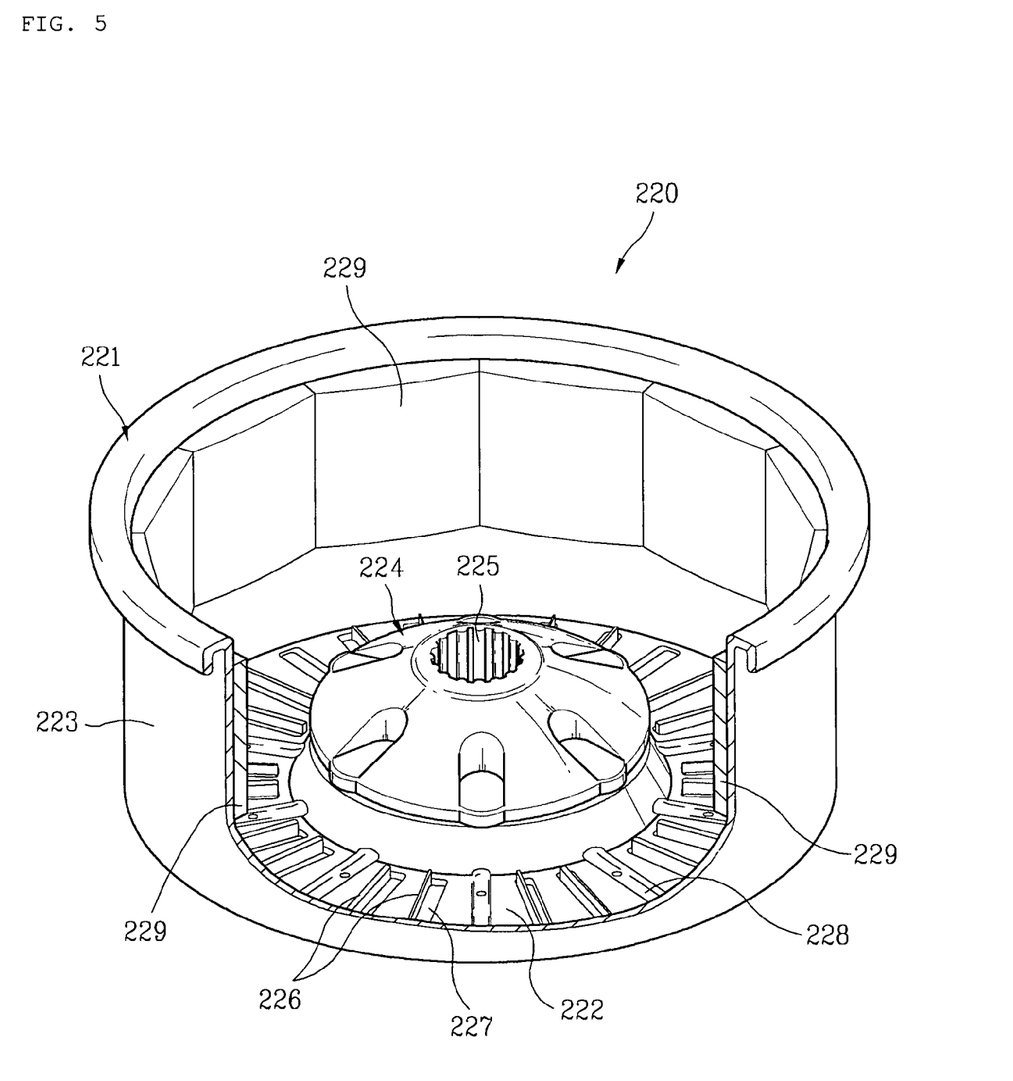
FIG. 5 is a cut perspective view showing a rotor of the motor according to the embodiment of the present invention.

FIGS. 4 and 5 show the stator 210 and the rotor 210 of the motor 200 shown in FIG. 3.

The motor 200 includes the stator 210 and the rotor 220 and when power is applied, a rotating magnetic field occurs between a coil 215 wound on the stator 210 and a permanent magnet 229 of the rotor to rotate the rotor 220.

As shown in FIG. 4, the stator 210 includes a stator core 212 that includes a plurality of teeth 213 wound on the coil and an insulator 214 that insulates between the coil 215 and the stator core 212.

The stator 210 is fixedly coupled to a side of the rear wall part 128 of the tub 120 by inserting a bolt, etc. into a coupling hole. The stator core 212 may be formed by stacking a steel plate and by connecting pieces divided in a spiral form or a circumferential direction.

As shown in FIG. 5, the rotor 220 is provided to surround the stator 210 and connected to the washing shaft 140 that is connected to the drum 130 by penetrating through the tub 120. Rotating the rotor 220 rotates the drum 130 through the washing shaft 140.

And, in order to rotatably supporting the washing shaft, a bearing housing (not shown) is generally provided between the stator 210 and the rear wall part 128 of the tub.

Describing the rotor 220 of the motor 200 in more detail, the rotor 220 includes the side wall part 223 and the base part 222. Herein, a rotor frame 221, including the side wall part 223 and the base part 222, is formed.

And, a through hole (not shown) is formed at a central portion of the base part 222 and may be connected to the washing shaft 140 to directly drive the drum 130. And, the rotor 220 includes the permanent magnet 229 that is provided inside the side wall part 223 in a circumferential direction. The permanent magnet 229 may be provided in plurality along the circumferential direction.

On the other hand, the connector 224 that connects the washing shaft 145 to the rotor frame 221 and the rotor frame 221 are integrally formed in the through hole or they may be coupled through a separate coupling means.

Herein, a separation 225 is formed at the central portion of the connector 224 to transfer the driving force of the rotor 220 to the washing shaft 140 by coupling the washing shaft 140 and the separation 225.

And, a plurality of cooling fins 226 and cooling holes 227 are formed at the base part 222 of the rotor frame 221 along the circumferential direction to prevent the stator 210 from overheating.

Also, in order to increase rigidity of the rotor frame 221, the base part 222 of the rotor frame 221 is formed with an embossing processing part 228.

Hereinafter, an operation of the motor according to one embodiment of the present invention will be described in detail.

Figure 6:
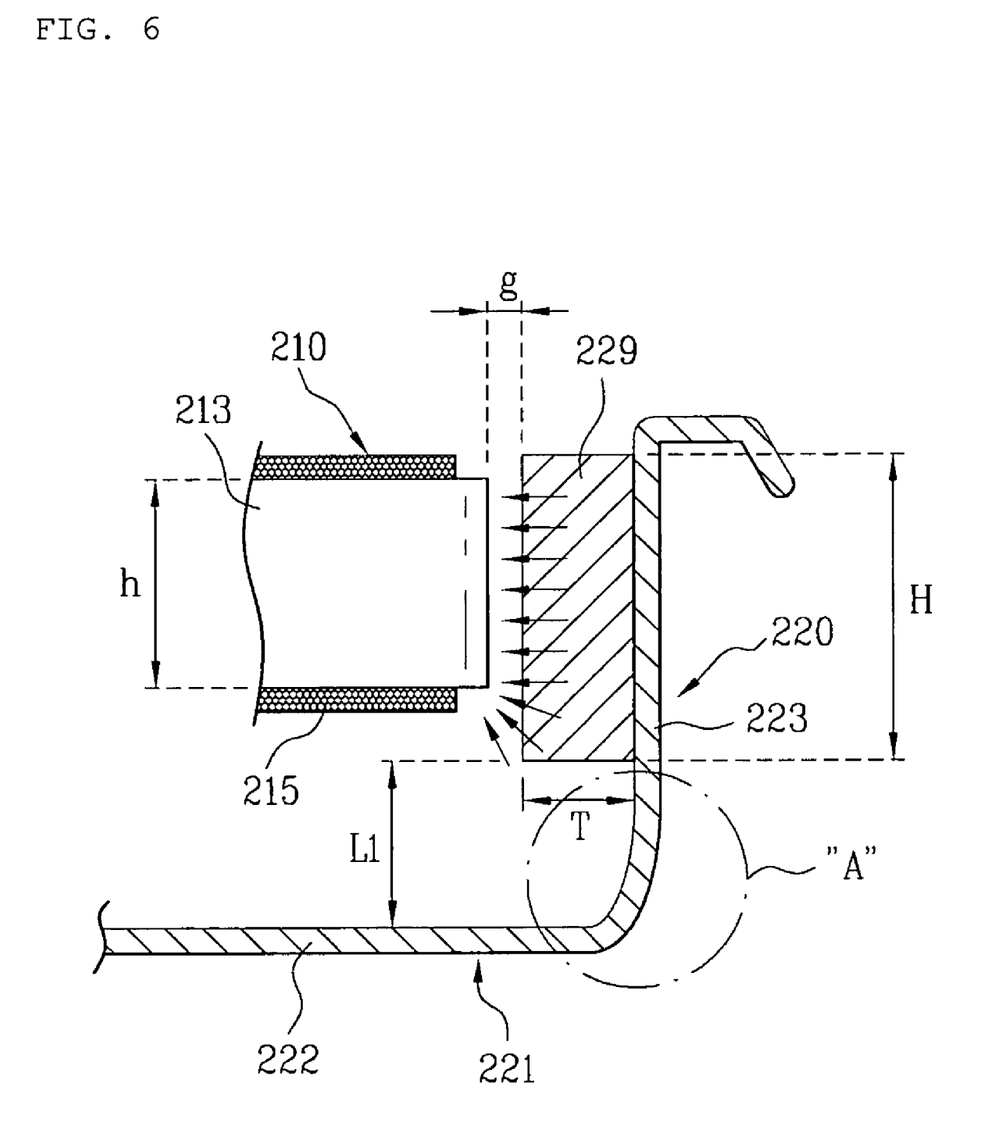
FIG. 6 is a partial cross-sectional view showing main parts of the motor according to an embodiment of the present invention.

FIG. 6 is a partial cross-sectional view showing main parts of the motor according to the embodiment of the present invention.

As shown in FIG. 6, the rotor 220 of the motor 200 according to the embodiment of the present invention includes the base part 222 and the side wall part 223. In addition, the base part 222 and the side wall part 223 are formed of a magnetic material.

Further, the motor 200 includes the permanent magnet 229 that is provided inside the side wall part 223. The magnetic flux generated from the permanent magnet 229 flows in the stator core 212 that is formed of a magnetic material, in particular, the stator core 212 through the teeth 213.

Therefore, in order to maximize the efficiency of the motor 220, there is a need to allow the magnetic flux generated from the permanent magnet 229 to flow in the stator 210 and minimize the magnetic flux leaked to the rotor 220.

To this end, in the present embodiment, a spacing distance L1 from the inner side surface of the base part 222 to the lower end of the permanent magnet is preferably formed to be larger than a radial thickness T of the permanent magnet.

In other words, it is preferable to maximize a distance between the inner side surface of the permanent magnet 229 and the base part 222. The reason is that there is a limitation in reducing a gap (g), which is an interval between the inner side surface of the permanent magnet 229 and the stator 210. Therefore, it is possible to maximally prevent the magnetic flux generated from the permanent magnet 220 from leaking from the rotor 220 by increasing the spacing gap L1 instead of reducing the gap.

On the other hand, in the present embodiment, a separate structure for magnetizing the permanent magnet 229 is not formed. In other words, the side wall part 223 of the present invention is formed to vertically extend from the base part to a portion where the permanent magnet 229 is fixed, without a step. In other words, the bending to magnetize the permanent magnet 229 is not formed at an "A" portion adjacent the permanent magnet 229.

Herein, it is preferable that the motor is structurally and dynamically symmetrical with respect to a radial direction due to its own characteristics. Therefore, when there is a deviation in this symmetry, there is a risk of increasing the vibration and noise when the rotor 220 rotates.

Therefore, the bending part 26 for fixing the position of the permanent magnet 229 can be omitted for more precisely fixing the permanent magnet 229. In addition, the permanent magnet can be very accurately fixed to the side wall part 223 by a method to be described below.

On the other hand, it is preferable that the height of the above-mentioned permanent magnet 229 is formed to be larger than the height of the stator H, that is, the stacked height. The reason is that the magnetic torque due to the permanent magnet 229 can be more increased by more increasing the height of the permanent magnet 229.

Of course, the height of the permanent magnet is increased such that the leakage magnetic flux may occur at the lower portion of the permanent magnet 229 as shown in FIG. 6; however, this can be minimized by making L1 larger than T as described above.

Hereinafter, another embodiment will be described with reference to FIG. 7.

Figure 7:
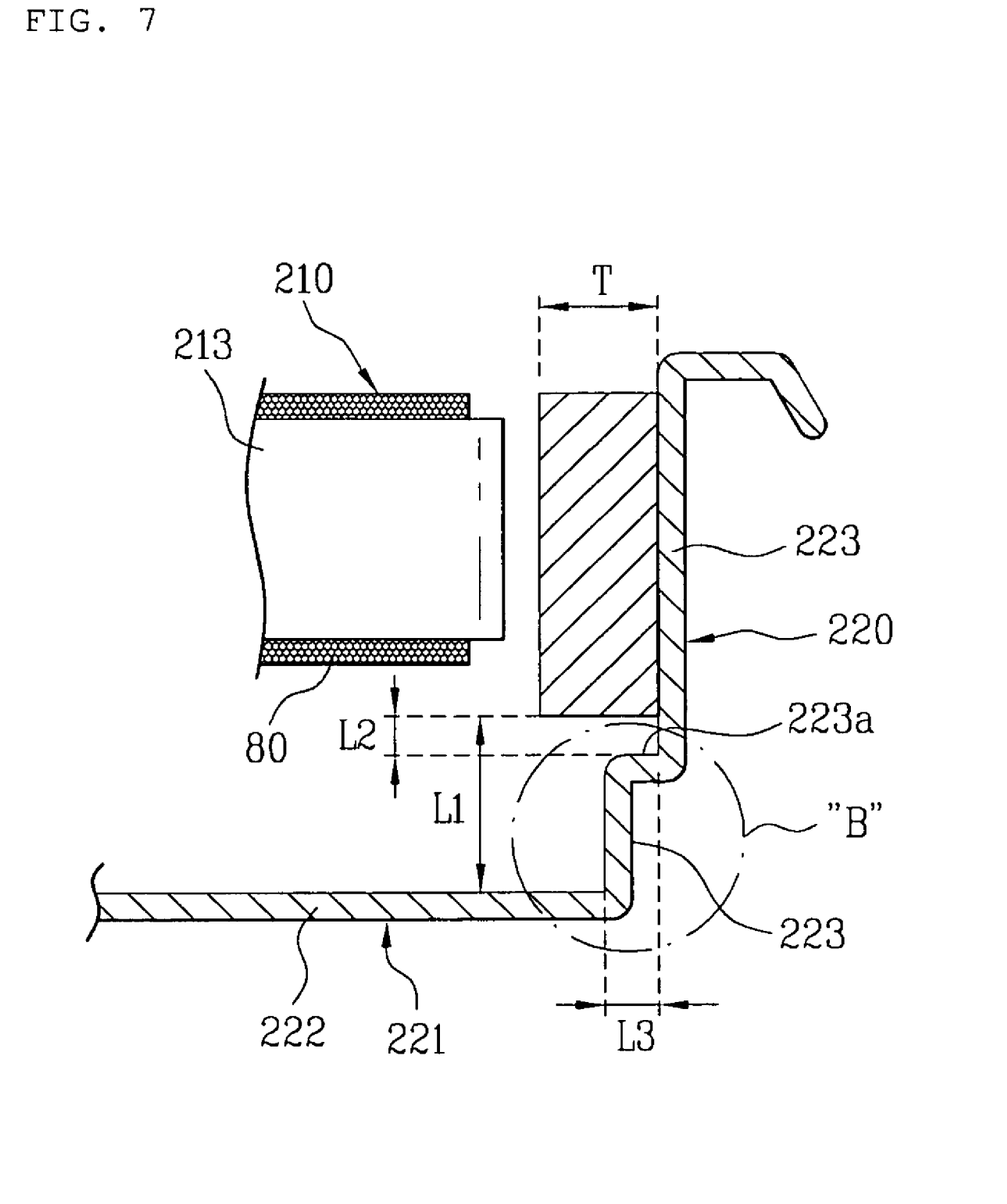
FIG. 7 is a partial cross-sectional view showing main parts of a motor according to another embodiment of the present invention.

FIG. 7 is a partial cross-sectional view showing main parts of a motor according to another embodiment of the present invention.

As shown in FIG. 7, likewise the above-mentioned embodiment, in the present embodiment the spacing distance L1 from the inner side surface of the base part 222 to the lower end of the permanent magnet 229 is formed to be larger than the radial thickness T of the permanent magnet 229. Therefore, the leakage of magnetic flux from lower end of the permanent magnet 229 to the base part 222 can be minimized.

Meanwhile, unlike the above-mentioned embodiment, in the present embodiment the side wall part 223 may include a bending part 223a to reinforce its intensity. In other words, the bending part 223a is formed at a "B" portion.

Herein, the side wall part is divided into a first side wall part 223 on the lower side and a second side wall part 223 on the upper side based on the bending part 223a. In addition, it is preferable that an inner diameter of the portion of the side wall part spaced from the second side wall part 223, that is, the base part 222 is formed to be larger than an inner diameter of the portion of side wall part adjacent the first side wall part 223, that is, the base part 222 through the bending part 223a.

Herein, the bending part 223a does not have a configuration for fixing or positioning the permanent magnet 229, unlike the bending part 26 (see FIG. 1) in the related art, but has a configuration for reinforcing the intensity of the side wall part 223. Therefore, it is preferable that the permanent magnet 229 is fixed while having the spacing distance L2 from the bending part 223a.

As shown in FIG. 7, in the present embodiment, it is preferable that the spacing distance L2 from the inner side surface of the bending part 223a to the lower end of the permanent magnet is formed to be larger than the radial thickness T of the permanent magnet.

First, spacing the lower end of the permanent magnet 229 from the bending part 223a is to prevent the magnetic flux from leaking through the bending part 223a. Therefore, as described above, the permanent magnet 229 is not fixed through the bending part 26. However, the spacing distance L2 should be sufficiently secured.

In other words, the spacing distance should be sufficiently secured with reference to the thickness T of the permanent magnet 229. The reason is that an amount of the magnetic flux leaked from the lower end of the permanent magnet 229 to the bending part 223a increases as the thickness of the permanent magnet 229 increases. Therefore, it is preferable that the spacing distance L2 from the inner side surface of the bending part 223a to the lower end of the permanent magnet 229 is formed to be larger than the radial thickness T of the permanent magnet 229.

On the other hand, from the viewpoint of reinforcing the intensity of the side wall part 223 due to the bending part 223a, it is not preferable that the bending part 223a approaches the base part 222. In other words, when L2 is too large, the bending part 223a excessively approaches the base part 222. Therefore, L2 is formed to have a predetermined distance but the radial thickness T of the permanent magnet 229 can be formed to be larger than the distance between a radial width L3 of the bending part 223a, that is, a distance between the inner surface of the first side wall part 223 and the inner surface of the second side wall part 223. FIG. 7 does not show such a form.

In other words, it is possible to minimize the leakage of the magnetic flux from the inner side of the lower end of the permanent magnet through the bending part 223a or the first side wall part 223 by forming the width L3 of the bending part 223a to be smaller than the thickness T of the permanent magnet 229.

In the above-mentioned embodiments, the thickness of the permanent magnet 229 can extend to the distance between the inner surface of the side wall part 223 at which the permanent magnet 229 is positioned and the inner side surface of the permanent magnet 229. The reason is that the permanent magnet 229 cannot be completely attached to the inner surface of the side wall part 223.

In other words, the reason is that adhesives for fixing the permanent magnet 229 can be interposed between the inner surface of the side wall part and the outer side surface of the permanent magnetic 229. Herein, the reason is that if a sufficient amount of adhesives are used, the interval can be formed due to the adhesives.

Therefore, in either case, the inner diameter formed by the permanent magnet, that is, the inner diameter formed by the inner side surface of the permanent magnet 229 is smaller than the inner diameter formed by the side wall part 223.

Herein, the inner diameter formed by the side wall part 223 means the inner diameter formed by the side wall part 223 including the first side wall part 223 and the second side wall part 223. In other words, it means the smallest inner diameter of the side wall part.

Therefore, it is possible to prevent the magnetic flux from leaking through the side wall part 223 of the rotor 220 by spacing the side wall part 223 from the inner wall surface of the permanent magnet 229.

Hereinafter, the embodiment of the present invention will be described with reference to FIGS. 8 to 10. Of course, the present embodiment may be independent from the above-mentioned embodiment as well as can be applied together.

Figure 8:
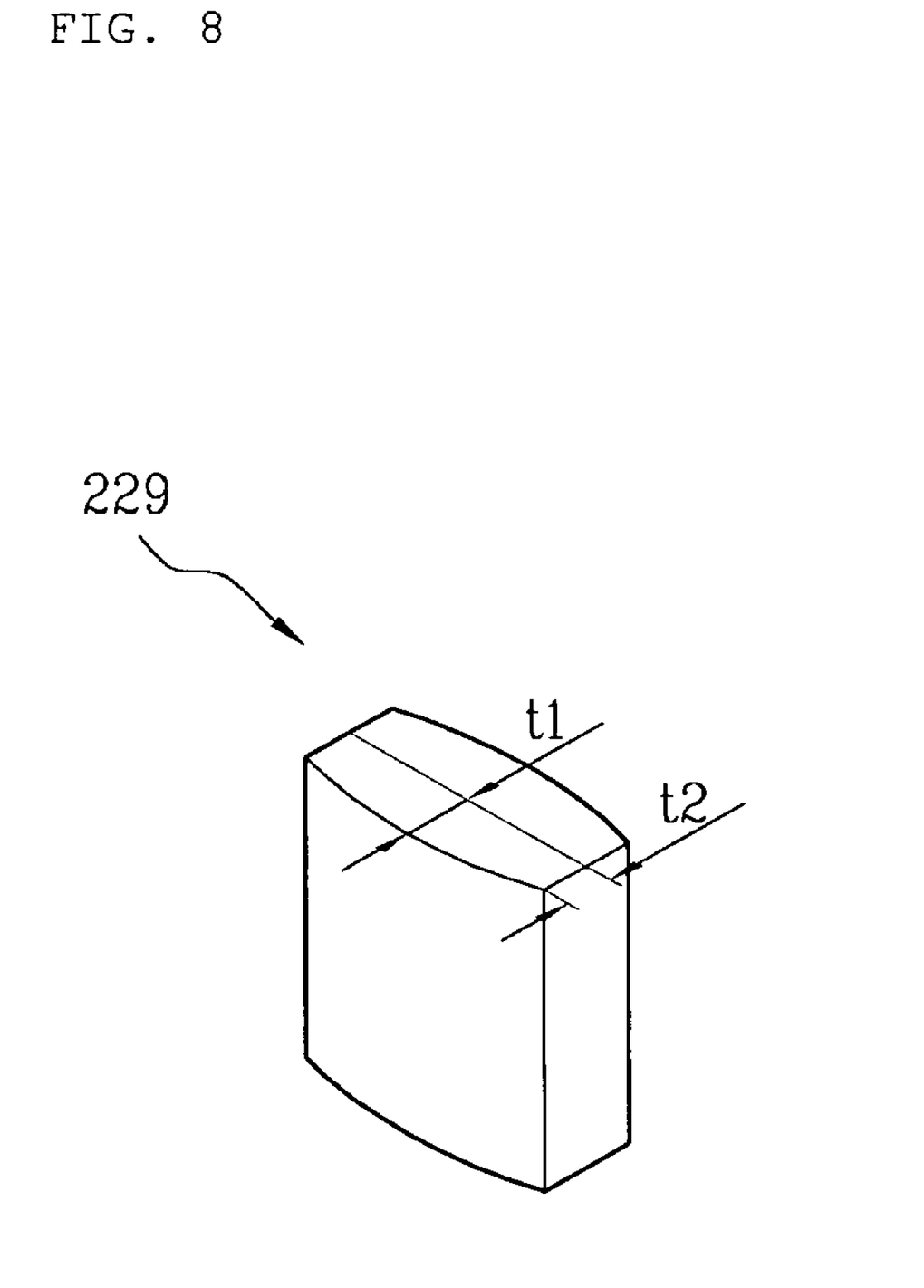
FIG. 8 is a perspective view showing a permanent magnet magnetized to the rotor of the motor according to the embodiment of the present invention.

According to the present embodiment, it is preferable that the permanent magnet 229 fixed to the rotor 220 is formed so that a portion facing the stator 210 has a convex surface as shown in FIG. 8.

In other words, unlike a general permanent magnet 229 installed at the rotor 220 that has a concave surface, the thickness can be formed to be smaller than the central thickness t1 of the permanent magnet 229 as going to a peripheral portion. In other words, the thickness t1 at the center of the magnetic pole can be formed to be larger than the thickness t2 at the outermost portion of the magnetic pole.

Herein, t1 and t2 may be, in particular, the radial thickness at the center line of the permanent magnet 229. Consequently, this means that the gap (g) at the center of the permanent magnet 229 is minimized and the gap g of the outermost portion of the magnetic pole is maximized.

Figure 9:
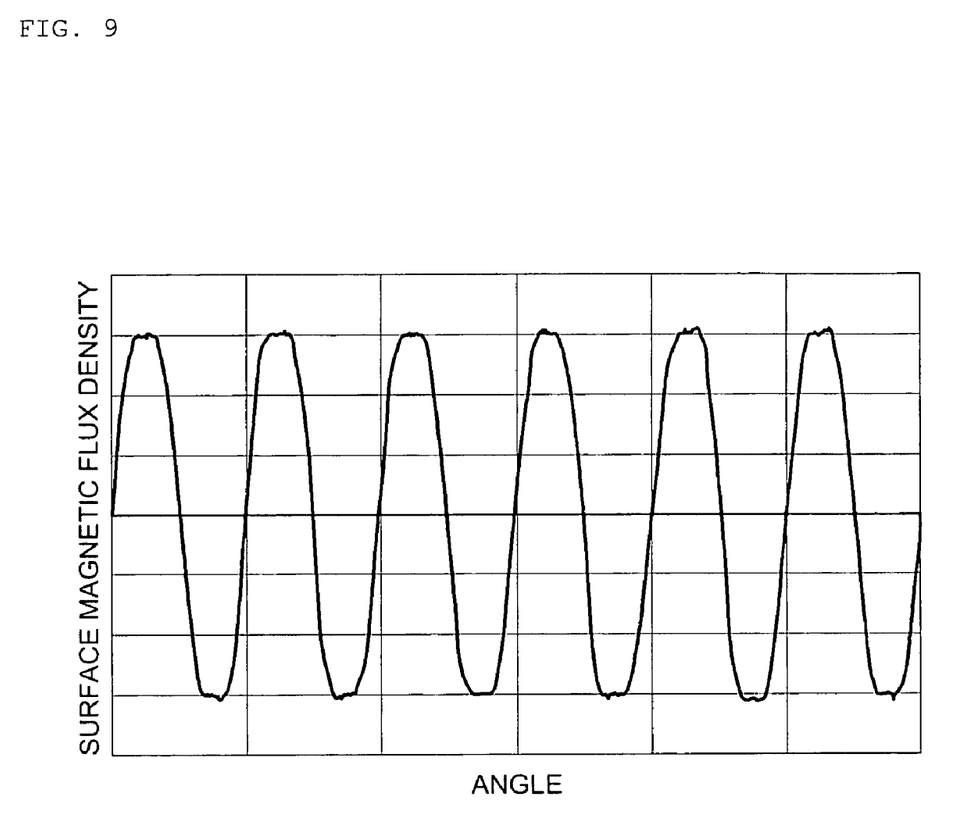
FIG. 9 is a graph showing magnetic flux density of the rotor of the motor according to the embodiment of the present invention.

Accordingly, as going from the center of the magnetic pole to the outermost portion of the magnetic pole, the magnetic flux density flowing in the stator 210 is small and the magnetic flux density appears similarly to the sine wave form as shown in FIG. 9 due to the change in the magnetic flux density.

In other words, since a point where the magnetic flux density is suddenly changed does not occur, the cogging torque and vibration can be minimized. This can be more clearly shown with reference to FIG. 10.

Figure 10:
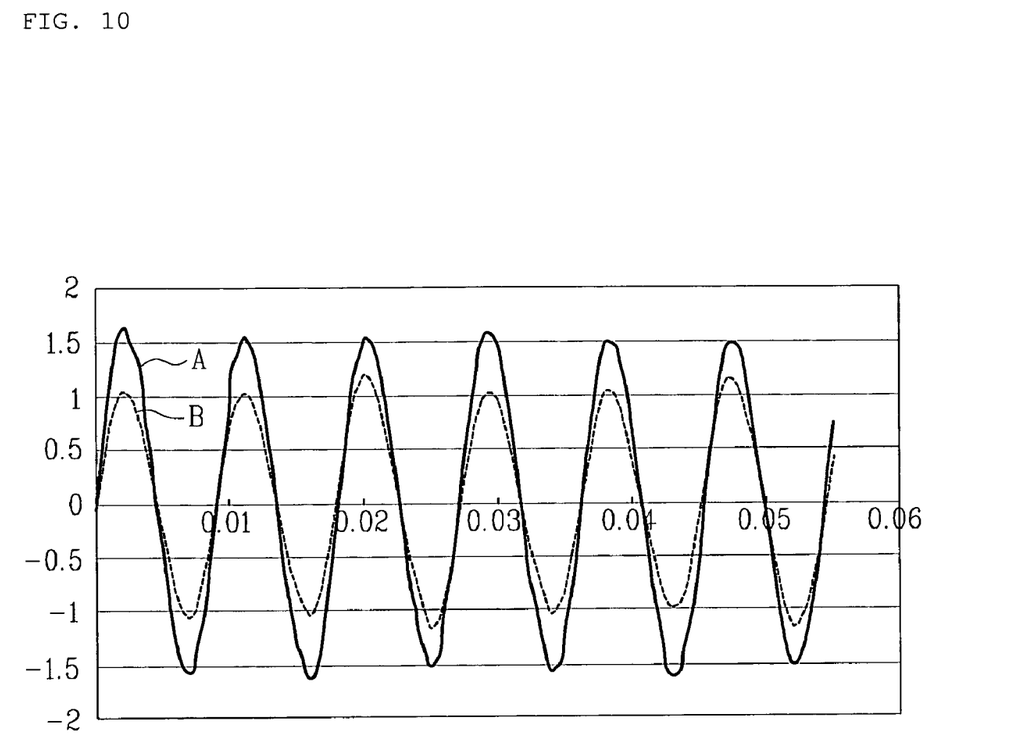
FIG. 10 is a comparison graph showing a cogging torque between the motor according to the embodiment of the present invention and the motor according to the related art.

As shown in FIG. 10, the cogging torque can be remarkably reduced in the case where the permanent magnet (for convenience of explanation, referred to as an R type permanent magnet) according to the present embodiment is used ("B" curve) as compared to the case where the C type permanent magnet in the related art is used ("A" curve).

Meanwhile, when the R type permanent magnet 229 is used, the gap (g) becomes partially large, such that the material cost of the permanent magnet 229 can be reduced accordingly. Further, when the C type permanent magnet in the related art is equal to the material cost, the height of the permanent magnet 229 can increased as much, such that the stronger magnetic flux is generated, thereby making it possible to more increase the magnetic torque performance.

Herein, the inner curved surface of the R type permanent magnet 229 may have a predetermined curvature radius R. Of course, the center of R will exist at the outer side of the radial direction of the permanent magnet 229. In addition, the outer curved surface can be formed so that it is closely attached to the side wall part of the rotor 220. In this case, the permanent magnet 229 may be more stably fixed to the side wall part 223.

However, the permanent magnet 229 may be provided in plurality along a circumferential direction of the rotor 220. For example, when the permanent magnet forms 48 poles, the rotor 220 may include 48 pieces of the permanent magnet 229.

In other words, one permanent magnet 229 may be formed to have one magnetic pole. The reason is that as described above, it is easy to form the radial thickness to be small from the center of one magnetic pole to both sides. In other words, when the permanent magnet 229 shown in FIG. 8 is formed to have two magnetic poles, the magnetic flux strength at the center of the magnetic pole can be inevitably changed due to the difference in thickness. Therefore, it is preferable to have one magnetic pole per one permanent magnet 229, in particular, the R-type permanent magnet 229.

At this time, when the inner side shape and the outer side shape are differentiated, there is a problem in that the inner side and the outer side of the permanent magnet should be differentiated each time the permanent magnet is fixed. When the motor is mass-produced, the increase of the manufacturing cost cannot be disregarded.

Accordingly, it is preferable that the curvature radii of the inner circumferential surface and the outer circumferential surface of the permanent magnet 229 are formed to be the same. In other words, it is possible to form both the inner side and the outer side to have the same curvature radius R. In this case, when the permanent magnet 229 is fixed, since there is no need to discriminate the inner side and the outer side, the manufacturing cost can be reduced. In this case, however, since the outer side surface of the permanent magnet 229 is not closely attached to the side wall part 223, a problem in that it is difficult to fix the permanent magnet may occur.

Figure 11:
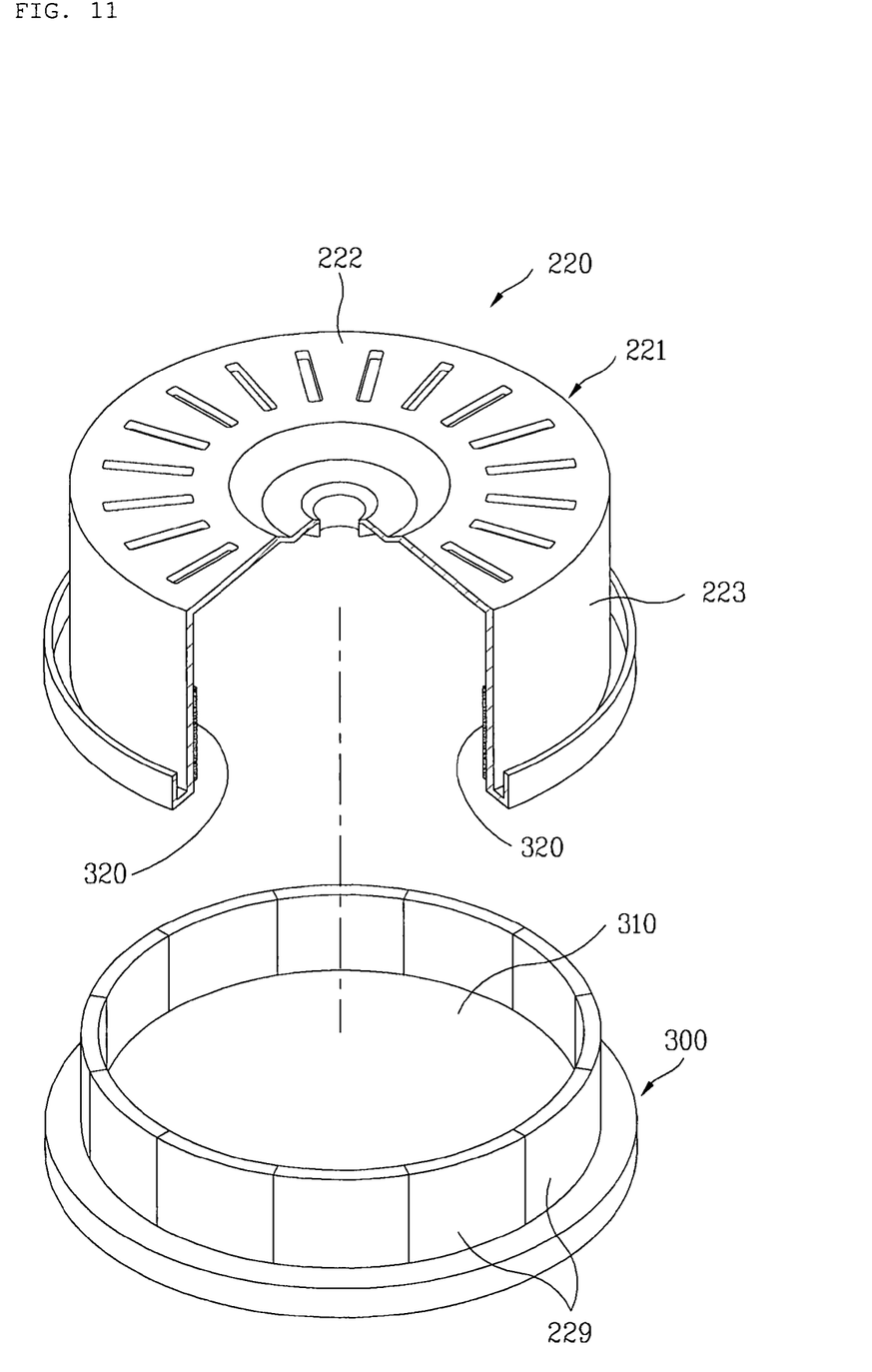
FIG. 11 is a schematic diagram showing a method of fixing the permanent magnet of the motor according to the embodiment of the present invention.

Hereinafter, a method of easily fixing the permanent magnet to the rotor will be described with reference to FIG. 11. The method can be applied to all the embodiments as described above.

First, the permanent magnet 229 is seated at a jig 300 at which the permanent magnet 229 can be seated. The permanent magnet 229 is seated so that the surface of the permanent magnet 229 fixed to the side wall part 223 of the rotor 220 is seated to face the outer side.

Herein, the jig 300 is formed with a seating pillar 310 that is formed to correspond to the inner circumferential surface shape of the permanent magnets 229 arranged according to the arrangement shape of the permanent magnet 229. The seating pillar 310 may be provided in a form of a plurality of electromagnets or a metallic body to which the permanent magnet 229 can be attached by its own magnetic force. The permanent magnet 229 is stably supported by the seating pillar 310.

Therefore, even when both the inner side and the outer side of the permanent magnet 229 are formed to have the curvature radius R, the permanent magnet 229 can be seated at the jig without deviating from the center.

Meanwhile, the inner side of the side wall part 223 of the rotor 220 is applied with adhesives 320. In other words, a portion to which the permanent magnet 229 is attached is previously applied with the adhesives 320. In some cases, the permanent magnet 229 seated to the jig 300 may be applied with the adhesives.

Thereafter, the jig 300 is inserted into the rotor 220. Herein, the fixed position of the permanent magnet 229 can be fixed very precisely without deviation by controlling an insertion length of the jig 300. Even if the curvature radii of the inner side surface and the outer side surface of the permanent magnet 229 are the same as well as there is no the bending part 223a, the permanent magnet 229 can be very precisely fixed to the rotor 220 by the above-mentioned method.

As described above, with the embodiment of the present invention, the motor with the increased efficiency can be provided by minimizing the magnetic flux leaked to the rotor 220.

Further, the motor with the increased efficiency can be provided by reducing the influence due to the cogging torque and the harmonic wave and thus, reducing the vibration and noise.

In addition, the motor can be easily mass-produced by simplifying the manufacturing process of the motor.

Moreover, with the present invention, the drum washing machine with the generally improved efficiency and the reduced vibration and noise can be provided by improving the motor performance, such that the satisfaction of the user can be maximized.

What is claimed is:

1. A motor including a stator and a rotor that is rotatably provided at an outer side in a radial direction of the stator, the rotor comprising:
a base part;
a side wall part that is integrally formed with the base part and vertically extended with respect to the base part; and
a permanent magnet that is provided at an inner side of the side wall part,
wherein the side wall part is straightly extended in a vertical direction and is connected to the base part,
wherein a height of the permanent magnet is formed to be larger than a stacked height of the stator facing the permanent magnet, and
wherein a spacing distance from an inner side surface of the base part to a lower end of the permanent magnet is formed to be larger than a radial thickness of the permanent magnet,
wherein an inner circumferential surface and an outer circumferential surface of the permanent magnet is formed in a curved surface having a curvature radius so that the radial thickness becomes smaller as going from the center of the permanent magnet to the circumferential direction;
wherein the inner circumferential surface and outer circumferential surface of the permanent magnet are formed in the same curvature radius so that the radial thickness becomes smaller as going from the center of the permanent magnet to the circumferential direction.

2. The motor of claim 1, wherein the base part and the side wall part of the rotor are integrally formed by press-processing a steel plate.

3. The motor of claim 1, wherein the permanent magnet is provided in plurality along a circumferential direction of the rotor.

4. The motor of claim 1, wherein the base part and the side wall part are integrally formed of a magnetic material.

5. A motor including a stator and a rotor that is rotatably provided at an outer side in a radial direction of the stator, the rotor comprising:
a base part;
a side wall part that is integrally formed with the base part and vertically extended with respect to the base part; and
a plurality of permanent magnets that are provided at an inner side of the side wall part according to a circumferential direction and has a curvature radius so that an inner circumferential surface and an outer circumferential surface has the smaller radial thickness as going from the center thereof to the circumferential direction,
wherein the side wall part is straightly extended in a vertical direction and is connected to the base part, and
wherein a height of the permanent magnet is formed to be larger than a stacked height of the stator facing the permanent magnet,
wherein an inner circumferential surface and an outer circumferential surface of the permanent magnet is formed in a curved surface having a curvature radius so that the radial thickness becomes smaller as going from the center of the permanent magnet to the circumferential direction;
wherein the inner circumferential surface and outer circumferential surface of the permanent magnet are formed in the same curvature radius so that the radial thickness becomes smaller as going from the center of the permanent magnet to the circumferential direction.

6. The motor of claim 5, wherein a spacing distance from an inner side surface of the base part to a lower end of the permanent magnet is formed to be larger than a radial thickness at a center of the permanent magnet.

7. A washing machine comprising:
a cabinet that forms an external appearance;
a tub that is installed inside the cabinet;
a drum that is rotatably installed inside the tub;
a motor including a stator that is fixed to the tub and a rotor that is rotatably provided at a radial outer side of the stator; and
a washing shaft that transfers a rotating force of the motor to the drum,
wherein the rotor comprises:
a base part;
a side wall part that is integrally formed with the base part and vertically extended with respect to the base part; and
a permanent magnet that is provided at an inner side of the side wall part,
wherein the side wall part is straightly extended in a vertical direction and is connected to the base part,
wherein a height of the permanent magnet is formed to be larger than a stacked height of the stator facing the permanent magnet, and
wherein a spacing distance from an inner side surface of the base part to a lower end of the permanent magnet is formed to be larger than a radial thickness of the permanent magnet,
wherein an inner circumferential surface and an outer circumferential surface of the permanent magnet is formed in a curved surface having a curvature radius so that the radial thickness becomes smaller as going from the center of the permanent magnet to the circumferential direction;
wherein the inner circumferential surface and outer circumferential surface of the permanent magnet are formed in the same curvature radius so that the radial thickness becomes smaller as going from the center of the permanent magnet to the circumferential direction.

8. The washing machine of claim 7, wherein the permanent magnet is provided in plurality along a circumferential direction of the rotor.

9. The washing machine of claim 7, wherein the base part and the side wall part are integrally formed of a magnetic material.

* * * * *